US012715391B2

(12) United States Patent
McIntosh

(10) Patent No.: US 12,715,391 B2
(45) Date of Patent: Aug. 25, 2026

(54) METHODS AND APPARATUS FOR VERIFYING CABIN AND FLIGHT DECK SECURITY

(71) Applicant: The Boeing Company, Arlington, VA (US)

(72) Inventor: Darren Carl McIntosh, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 482 days.

(21) Appl. No.: 18/356,034

(22) Filed: Jul. 20, 2023

(65) Prior Publication Data

US 2025/0026305 A1 Jan. 23, 2025

(51) Int. Cl.

*B60R 22/48* (2006.01)
*B60R 22/32* (2006.01)
*B64D 11/06* (2006.01)

(52) U.S. Cl.

CPC ............ *B60R 22/48* (2013.01); *B60R 22/322* (2013.01); *B64D 11/062* (2014.12); *B60R 2022/4816* (2013.01); *B60R 2022/4858* (2013.01); *B60R 2022/4866* (2013.01)

(58) Field of Classification Search

CPC .................. B60R 22/48; B60R 22/322; B60R 2022/4816; B60R 2022/4858; B60R 2022/4866; B64D 11/062
USPC .............................................................. 700/1
See application file for complete search history.

(56) References Cited

U.S. PATENT DOCUMENTS

2003/0160497 A1* 8/2003 Darr .................. B64D 45/0044 297/468
2014/0125355 A1* 5/2014 Grant ................ B64D 11/0647 324/629
2017/0283086 A1* 10/2017 Garing .............. B64D 11/0638
2018/0265215 A1* 9/2018 Pollard ............... B64D 11/062
2020/0017068 A1* 1/2020 Moffa .................... B60N 3/102
2021/0206343 A1* 7/2021 Welk ...................... B60R 22/48
2021/0253255 A1* 8/2021 Johnson ................. B60R 22/48
2021/0347323 A1* 11/2021 Thomas ........... B60R 21/01538

(Continued)

OTHER PUBLICATIONS

Theme Park Tourist, "This is How Disney Tries to Stop its Attraction Operators From Getting Bored," retrieved from https://www.themeparktourist.com/features/20160811/32113/6-cast-member-jobs-nearly-every-attraction? page=2, published Aug. 12, 2016, 13 pages.

(Continued)

*Primary Examiner* — Md Abul Azad
(74) *Attorney, Agent, or Firm* — Hanley, Flight & Zimmerman, LLC

(57) ABSTRACT

Methods and apparatus for verifying cabin and flight deck security are disclosed herein. An example apparatus includes interface circuitry, machine readable instructions, and programmable circuitry to at least one of instantiate or execute the machine readable instructions to receive output from an identifier, the identifier associated with a location of a passenger seat on an aircraft, receive output from a seat belt latch sensor, the seat belt latch sensor associated with a seat belt of the passenger seat, determine a usage status of the seat belt at the location of the passenger seat, and generate a seat diagram, the seat diagram including the usage status of the seat belt at the location of the passenger seat.

20 Claims, 14 Drawing Sheets

(56) References Cited

U.S. PATENT DOCUMENTS

2021/0371115 A1 * 12/2021 Zaman .................. B64D 45/00

OTHER PUBLICATIONS

Shawn, "How Do Car Seat Belt Sensors Work—Why you need them," Carsbooth, retrieved from https://carsbooth.com/how-do-car-seat-belt-sensors-work/#:%7E:text=The%20seat%20belt%20sensor%20detects%20when%20the%20metal,until%20the%20occupant%20of%20that%20seat%20buckles%20in, published Sep. 18, 2022, 11 pages.

IEE Smart Sensing Solutions, "Occupant Detection for Seat Belt Reminders," retrieved from https://iee-sensing.com/automotive/safety-and-comfort/seat-belt-reminder/, retrieved on Sep. 19, 2023, 7 pages.

Wikipedia, "Direct TPMS," retrieved from https://en.wikipedia.org/wiki/Direct_TPMS, retrieved on Sep. 19, 2023, 6 pages.

* cited by examiner 1000
1005
725
SEAT BELT D10
NOT FASTENED
710

METHODS AND APPARATUS FOR VERIFYING CABIN AND FLIGHT DECK SECURITY

FIELD OF THE DISCLOSURE

This patent relates generally to a tracking system and, more particularly, to methods and apparatus for verifying cabin and flight deck security.

BACKGROUND

Aircraft seats include safety belts specifically designed for usage by flight attendants, pilots, and passengers. For example, seat belts designed for use by flight attendants can include a four-point harness for crew seats, allowing a flight attendant to immediately leave a seat when needed by rotating a buckle to release all straps of the seat belt. Seat belts designed for pilot usage can include a five-point harness that prevents the pilot from slipping forward during sudden maneuvers and/or turbulence. Conversely, the passenger seat belt includes a two-piece lap belt with a lift-lever belt to provide protection during up and down movements (e.g., during turbulence). On some passenger seat belts, in particular business class/first class seats, a three-point seat belt may be installed, which includes both a lap belt and a cross shoulder belt restraint.

SUMMARY

An example apparatus includes interface circuitry, machine readable instructions, and programmable circuitry to at least one of instantiate or execute the machine readable instructions to receive output from an identifier, the identifier associated with a location of a passenger seat on an aircraft and receive output from a seat belt latch sensor, the seat belt latch sensor associated with a seat belt of the passenger seat, determine a usage status of the seat belt at the location of the passenger seat, and generate a seat diagram, the seat diagram including the usage status of the seat belt at the location of the passenger seat.

An example method includes receiving output from an identifier, the identifier associated with a location of a passenger seat on an aircraft, receiving output from a seat belt latch sensor, the seat belt latch sensor associated with a seat belt of the passenger seat. The method also includes determining a usage status of the seat belt at the location of the passenger seat, and generating a seat diagram, the seat diagram including the usage status of the seat belt at the location of the passenger seat.

An example non-transitory machine readable storage medium includes instructions to cause programmable circuitry to at least receive output from an identifier, the identifier associated with a location of a passenger seat on an aircraft and receive output from a seat belt latch sensor, the seat belt latch sensor associated with a seat belt of the passenger seat. The instructions also cause the programmable circuitry to at least determine a usage status of the seat belt at the location of the passenger seat and generate a seat diagram, the seat diagram including the usage status of the seat belt at the location of the passenger seat.

Figure 1:
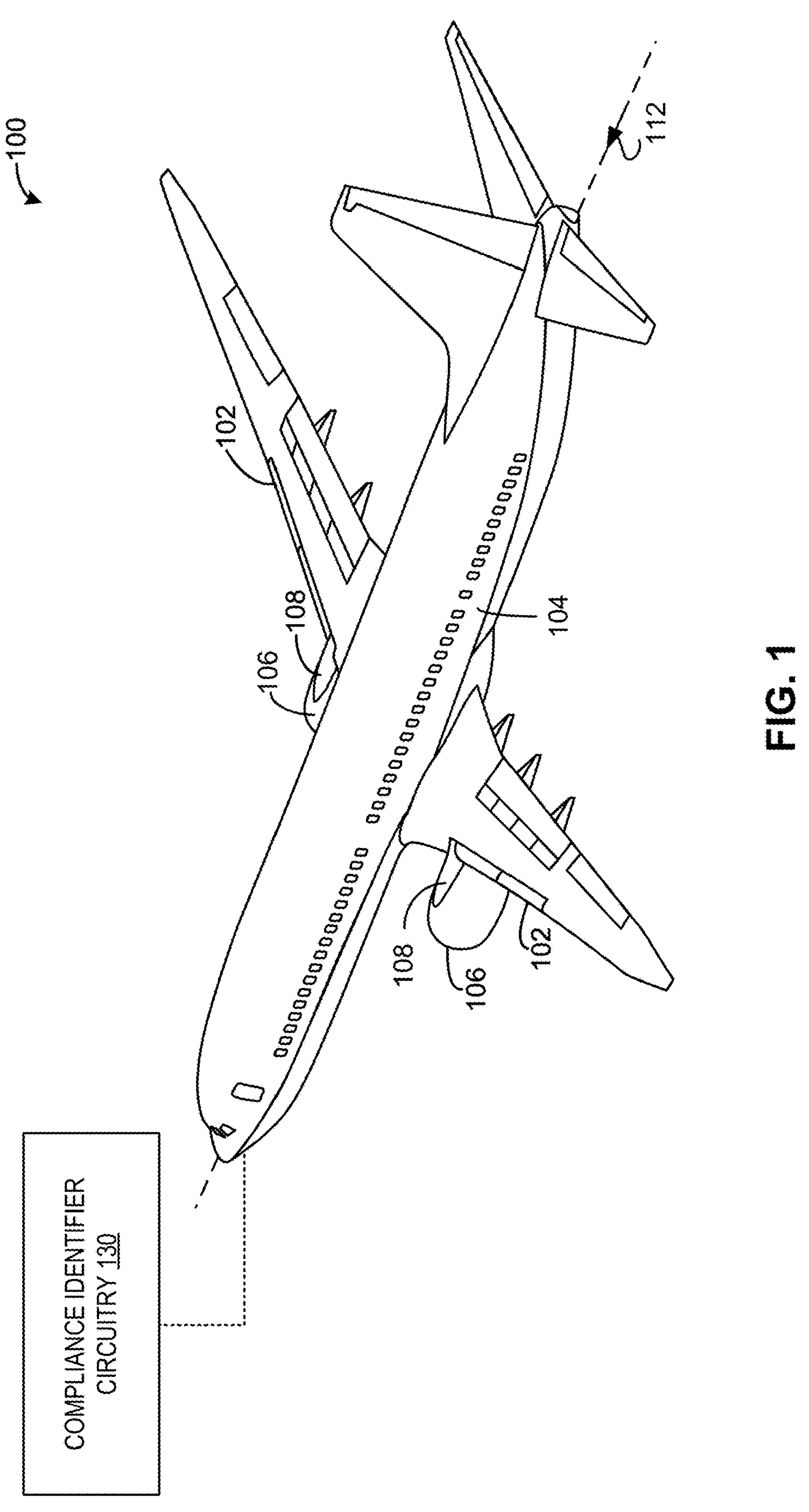
FIG. 1 illustrates an example aircraft in which the examples disclosed herein can be implemented.

In general, the same reference numbers will be used throughout the drawing(s) and accompanying written description to refer to the same or like parts. The figures are not to scale. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

DETAILED DESCRIPTION

Aircraft are equipped with seatbelts of different types based on intended usage (e.g., by pilots, flight attendants, passengers, etc.). In some examples, lift-lever belts are commonly used by passengers (e.g., the belt unfastens when a lever is lifted) and are a practical choice for lap-based belts due to their cost-effectiveness and light weight. Such lap belts keep passengers securely positioned in their seats during rapidly changing up and down motions commonly encountered during flights and/or during overall flight turbulence resulting from a sudden shift in airflow (e.g., due to jet streams, etc.). There are numerous safety reasons for assuring that passengers use their seatbelts as instructed by flight attendants before and/or during a flight (e.g., to prevent physical injuries due to anticipated and/or sudden turbulence, etc.). According to current protocol, flight attendants turn on a fasten seat belt lit signage, which is accompanied with an audible cabin chime. After the chime, the flight attendants perform a visual check of the main cabin and/or provide a verbal reminder to passengers regarding the need for seatbelt usage. However, with such a visual check, it is difficult for flight attendants to actively monitor seatbelt usage. Additionally, flight attendants must constantly monitor passenger movements on a plane (e.g., in the main cabin) to ensure the safety of the aircraft, flight crew, and/or air passengers. For example, flight attendants monitor passengers to ensure that flight decks are protected from intrusion (e.g., when the flight deck door is open). Such ongoing monitoring can result in the introduction of additional safety features (e.g., installed physical secondary barriers to protect flight decks from intrusion, etc.), that could otherwise be avoided with the usage of an effective and efficient method of monitoring passenger movement(s) in the main cabin.

For example, some physical barriers can work well on spacious wide body airplanes but are more difficult to design for space-limited narrow body airplane models. Likewise, some physical barrier concepts work well on newly developed airplanes but are not feasible for aircraft in the retrofit market. Current methods of securing a flight deck include the use of a peep hole positioned in a flight deck door. For example, following protocol, a pilot needing to leave the flight deck contacts a flight attendant working at the front of the plane. The flight attendant initiates a series of steps to physically secure the area of the flight deck before the pilot exits via the flight deck door. The peep hole in the flight deck door can be used to ensure the area is secure before the door is opened/closed.

Methods and apparatus disclosed herein allow for monitoring of passenger movement throughout the main cabin, thus eliminating the need for a physical secondary security barrier on commercial airplanes and/or enhancing current protocols associated with securing the flight deck area. In examples disclosed herein, seat belt locking sensors, coupled with seat occupied sensors and/or seat location identifiers can be used for transferring data to a central database onboard an airplane. In some examples, the seat belt locking sensors, seat occupied sensors and/or seat location identifiers transfer data via passive (e.g., not using batteries) and/or active (e.g., using batteries, or via airplane power) radio frequency identification (RFID)-based transmitters at each seat location. In examples disclosed herein, the flight attendant initially turns on the fasten seat belt lit signage (e.g., accompanied with an audible cabin chime), following which an attendant control panel receives the seat belt locking, seat occupied and/or seat location data and displays this information/status to the flight attendant. In some examples, the seat belt notification display includes an identification of (1) fastened seat belt(s) (e.g., latched seat belt), (2) a seat belt(s) that are not fastened (e.g., unlatched seat belt), and/or (3) no signal (e.g., due to error, low battery, etc.) associated with the seat belt status identification (e.g., unknown usage status).

In some examples, the seat belt(s) can be locked to restrict passenger movement(s) within the cabin (e.g., when the seat belt fasten sign is activated, during taxi, takeoff, turbulence, landing, etc.). Such a seat belt locking feature can include an automatic safety override that releases the locking feature when the airplane experiences accelerations (e.g., experiences G-forces, exceeds a predetermined acceleration threshold, etc.) that are beyond that of normal flight operations. Furthermore, Light Detection and Ranging (LIDAR)-based sensors can be implemented to detect passenger movement(s) (e.g., using optical sensors, proximity sensors, light beam-based sensors, etc.). In some examples, an alarm can be used as part of the flight attendant control panel to indicate that there is an unexpected passenger movement(s) (e.g., seat belt sensor indicates that the seat belt is fastened, but the seat occupied sensor indicates that the passenger is not occupying the seat, etc.).

While in examples disclosed herein an aircraft main cabin is used and described as an example in which the methods of passenger detection can be implemented, any other type of vehicle can be used, including, but not limited to an aircraft, a spacecraft, a rotorcraft, a satellite, a terrestrial vehicle, a surface waterborne vehicle, a sub-surface waterborne vehicle, a hovercraft, and/or combinations thereof. Examples disclosed herein detail the integration of seat belt latch sensors and pressure sensors (e.g., positioned in a seat base) and the transmission of data obtained from these sensors to a central database for use as real-time data by flight attendants (e.g., using a seat-based layout graphic).

Turning to the figures, FIG. 1 illustrates an example aircraft 100 in which the examples disclosed herein can be implemented. While in the example of FIG. 1 the aircraft 100 is a passenger plane or a cargo plane, the aircraft 100 may be any other type of air vehicle, water vehicle, land vehicle, and/or space vehicle. In the illustrated example, the aircraft 100 includes a fuselage 104 and wings 102 (e.g., a right wing and a left wing) extending laterally outward from the fuselage 104. Each of the wings 102 of the illustrated example supports an aircraft engine 106 via a pylon 108. A longitudinal axis 112 of the aircraft 100 is labeled in FIG. 1.

In the example of FIG. 1, the aircraft 100 includes compliance identifier circuitry 130. The compliance identifier circuitry 130 provides an assessment of flight passenger compliance associated with the required usage of seatbelts (e.g., as provided via an alert and/or communicated by a flight attendant). In some examples, the compliance identifier circuitry 130 determines whether a passenger is moving instead of seated, as required at a specific point in time during the flight (e.g., due to turbulence, the need to secure the flight deck, etc.). In examples disclosed herein, the compliance identifier circuitry 130 generates an overview of passenger compliance (e.g., seat belt usage) on a seat-by-seat basis (e.g., according to a row and seat location in the flight cabin). For example, the compliance identifier circuitry 130 generates an overview of the seats that are (1) seat-belt compliant, (2) not seat-belt compliant, and/or (3) require further flight attendant attention. In some examples, the compliance identifier circuitry 130 determines whether a passenger is moving about the flight cabin instead of seated. As described in more detail in connection with FIG. 2, the compliance identifier circuitry 130 identifies compliance and/or passenger-based movement using one or more sensor(s).

Figure 2:
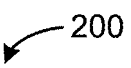
FIG. 2 is a block diagram representative of example compliance identifier circuitry that may be implemented in accordance with teachings disclosed herein.
Figure 2:
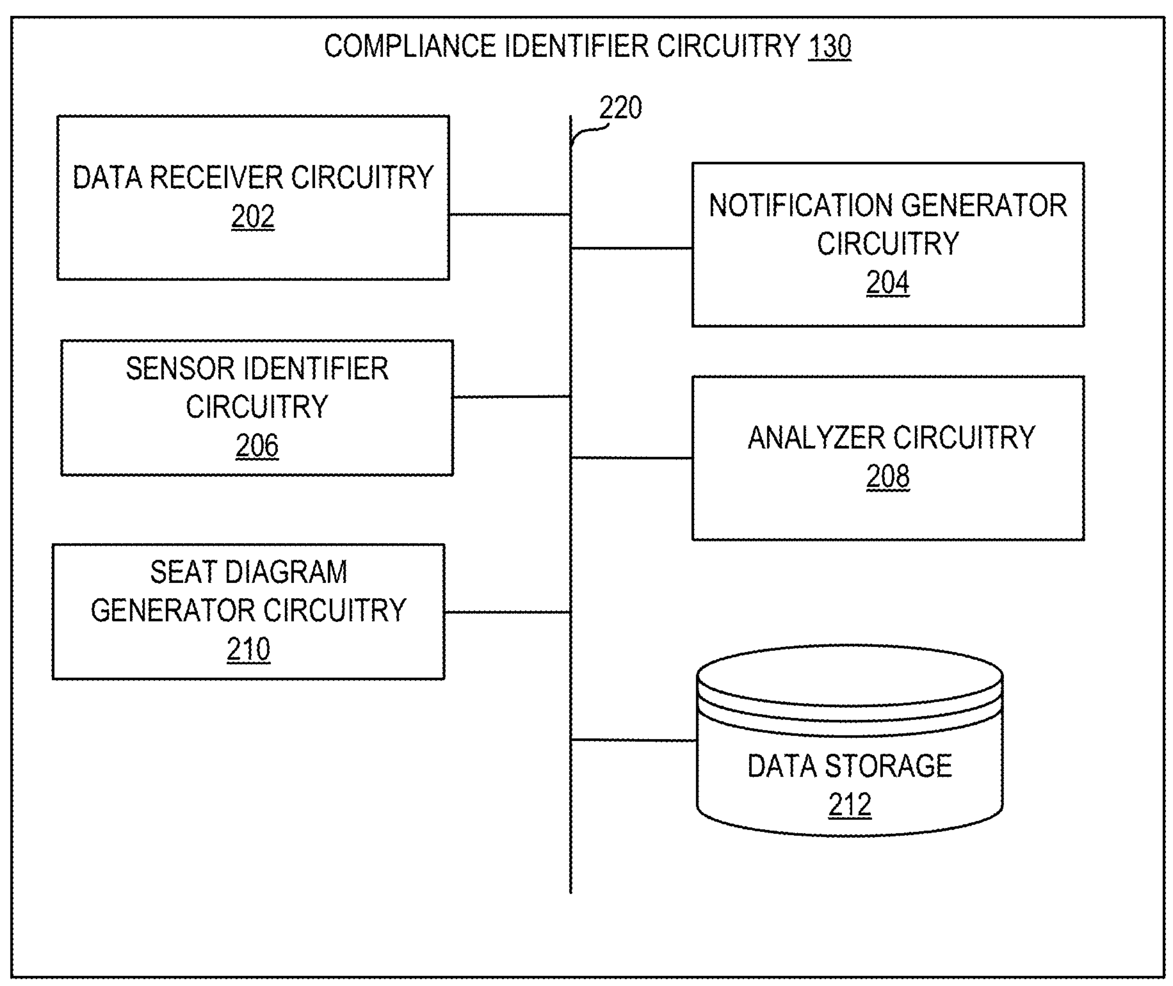

FIG. 2 is a block diagram 200 of an example implementation of the compliance identifier circuitry 130 of FIG. 1. The compliance identifier circuitry 130 of FIG. 1 may be instantiated (e.g., creating an instance of, bring into being for any length of time, materialize, implement, etc.) by programmable circuitry such as a Central Processing Unit (CPU) executing first instructions. Additionally or alternatively, the compliance identifier circuitry 130 of FIG. 1 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

In the illustrated example, the compliance identifier circuitry 130 includes example data receiver circuitry 202, example notification generator circuitry 204, example sensor identifier circuitry 206, example analyzer circuitry 208, example seat diagram generator circuitry 210, and example data storage 212. In the example of FIG. 2, the data receiver circuitry 202, the notification generator circuitry 204, the sensor identifier circuitry 206, the analyzer circuitry 208, the seat diagram generator circuitry 210, and/or the data storage 212 are in communication using an example bus 220.

The data receiver circuitry 202 receives data associated with seat belt usage requirements. In some examples, the data receiver circuitry 202 receives an indication (e.g., from the flight deck, the pilot, etc.) that seat belts are to be fastened (e.g., due to expected turbulence, need to secure the flight deck, etc.). In some examples, the data receiver circuitry 202 receives an indication that movement throughout the flight cabin should be reduced and/or restricted. In some examples, the data receiver circuitry 202 determines which sensors are to be tracked with respect to passenger seat belt usage and/or movement throughout the flight cabin. In some examples, the data receiver circuitry 202 receives indications when the flight deck needs to be secured (e.g., to allow a pilot to exit and/or re-enter the flight deck safely).

The notification generator circuitry 204 generates a notification (e.g., for passengers) when seat belt usage is required and/or movement throughout the flight cabin is restricted. In some examples, the notification generator circuitry 204 generates the notification for flight attendants to enforce. In some examples, the notification generator circuitry 204 generates a notification for occupants of the flight deck (e.g., pilot, co-pilot) when the flight deck is secured (e.g., allowing the pilot to leave the flight deck when necessary). In some examples, the notification generator circuitry 204 can be used to lock seat belts automatically after passengers are notified of required seat belt usage (e.g., during take-off, landing, securing of flight deck, etc.). However, a seat belt locking override mechanism can be included to allow flight passengers to unlock the seat belt voluntarily as needed. For example, an automatic safety override can be implemented that releases the locking feature when the airplane experiences accelerations (e.g., G-forces) that are beyond that of normal flight operations. In some examples, the notification generator circuitry 204 generates an alert indicating that a passenger is not present in his or her seat (e.g., based on data received from pressure sensor(s) located in the passenger seat) when a seat belt usage requirement is in effect.

The sensor identifier circuitry 206 receives data from sensor(s) positioned to track seat-belt usage and/or passenger movement throughout the flight cabin area. In some examples, the sensor identifier circuitry 206 identifies and collects data from sensor(s) identifying passenger seat location(s), passenger seat occupancy status (e.g., based on pressure sensor data), seat belt usage compliance (e.g., based on seat belt latch sensor data), and/or any data related to verifying passenger seat belt usage and/or movement throughout the flight cabin. In some examples, the sensor identifier circuitry 206 identifies radio frequency identification (RFID) antennas positioned throughout a flight cabin to receive data from RFID transmitters (e.g., located in the flight cabin seats). For example, pressure information can be transmitted from a passenger seat (e.g., via a pressure transducer) to the sensor identifier circuitry 206 (e.g., using RF technology, systems using mechanical, electrical, and/or magnetic-based sensing data, etc.). In some examples, the sensor identifier circuitry 206 receives data from optical sensor(s) positioned to monitor passenger movement throughout the flight cabin. However, any other types of sensor(s) can be used in combination with and/or in place of the sensors described in the examples disclosed herein.

The analyzer circuitry 208 determines seat belt usage compliance on a seat-by-seat basis throughout the flight cabin (e.g., based on input received from the sensor identifier circuitry 206). In some examples, the analyzer circuitry 208 identifies passenger seats where seat belts are fastened, not fastened, and/or where additional information and/or intervention is needed (e.g., flight attendant attention required to confirm seat belt usage status). In some examples, the analyzer circuitry 208 identifies passenger seats and/or flight cabin area(s) where passenger movement is detected (e.g., when the flight deck is being secured, etc.), allowing flight attendant(s) to intervene as necessary to secure the flight deck and/or ensure passenger seat belt usage compliance is maintained (e.g., during expected turbulence, aircraft landing, aircraft takeoff, etc.). In some examples, the analyzer circuitry 208 records seat belt data and/or activity and transfers the recorded data from the aircraft 100 to a ground-based database and/or monitoring station. In some examples, such data can include timestamps indicating passenger movements within the flight cabin and/or overall seat belt usage linked to a seat identifier (e.g., fastened, unfastened, etc.).

The seat diagram generator circuitry 210 generates a seat diagram showing seat belt usage status on a seat-by-seat basis. As described in more detail in connection with FIGS.

5-10, the seat diagram generator circuitry 210 generates a visual representation of seat belt usage compliance based on data received from the analyzer circuitry 208. In some examples, the seat diagram generator circuitry 210 includes visual indicators on a seat-by-seat basis showing seats where seat belts are fastened, seats where seat belts are not fastened, and/or seats where additional attention is required to determine seat belt usage status (e.g., a visual inspection and/or confirmation of seat belt usage). In some examples, the seat diagram generator circuitry 210 generates the seat belt usage diagram(s) and/or indicators as part of an attendant control panel, shown in more detail in connection with FIG. 7. As such, flight attendants can verify seat belt usage and/or compliance remotely.

The data storage 212 can be used to store any information associated with the data receiver circuitry 202, the notification generator circuitry 204, the sensor identifier circuitry 206, the analyzer circuitry 208, and/or the seat diagram generator circuitry 210. The example data storage 212 of the illustrated example of FIG. 2 can be implemented by any memory, storage device and/or storage disc for storing data such as flash memory, magnetic media, optical media, etc. Furthermore, the data stored in the example data storage 212 can be in any data format such as binary data, comma delimited data, tab delimited data, structured query language (SQL) structures, image data, etc.

In some examples, the apparatus includes means for receiving data. For example, the means for receiving data may be implemented by data receiver circuitry 202. In some examples, the data receiver circuitry 202 may be instantiated by programmable circuitry such as the example programmable circuitry 1112 of FIG. 11. For instance, the data receiver circuitry 202 may be instantiated by the example microprocessor 1200 of FIG. 12 executing machine executable instructions such as those implemented by at least block 305 of FIG. 3. In some examples, the data receiver circuitry 202 may be instantiated by hardware logic circuitry, which may be implemented by an ASIC, XPU, or the FPGA circuitry 1300 of FIG. 13 structured to perform operations corresponding to the machine readable instructions. Additionally or alternatively, the data receiver circuitry 202 may be instantiated by any other combination of hardware, software, and/or firmware. For example, the data receiver circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating a notification. For example, the means for generating a notification may be implemented by notification generator circuitry 204. In some examples, the notification generator circuitry 204 may be instantiated by programmable circuitry such as the example programmable circuitry 1112 of FIG. 11. For instance, the notification generator circuitry 204 may be instantiated by the example microprocessor 1200 of FIG. 12 executing machine executable instructions such as those implemented by at least block 310 of FIG. 3. In some examples, the notification generator circuitry 204 may be instantiated by hardware logic circuitry, which may be implemented by an ASIC, XPU, or the FPGA circuitry 1300 of FIG. 13 structured to perform operations corresponding to the machine readable instructions. Additionally or alternatively, the notification generator circuitry 204 may be instantiated by any other combination of hardware, software, and/or firmware. For example, the notification generator circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying sensor(s). For example, the means for identifying sensor(s) may be implemented by sensor identifier circuitry 206. In some examples, the sensor identifier circuitry 206 may be instantiated by programmable circuitry such as the example programmable circuitry 1112 of FIG. 11. For instance, the sensor identifier circuitry 206 may be instantiated by the example microprocessor 1200 of FIG. 12 executing machine executable instructions such as those implemented by at least block 315 of FIG. 3. In some examples, the sensor identifier circuitry 206 may be instantiated by hardware logic circuitry, which may be implemented by an ASIC, XPU, or the FPGA circuitry 1300 of FIG. 13 structured to perform operations corresponding to the machine readable instructions. Additionally or alternatively, the sensor identifier circuitry 206 may be instantiated by any other combination of hardware, software, and/or firmware. For example, the sensor identifier circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for analyzing. For example, the means for analyzing may be implemented by analyzer circuitry 208. In some examples, the analyzer circuitry 208 may be instantiated by programmable circuitry such as the example programmable circuitry 1112 of FIG. 11. For instance, the analyzer circuitry 208 may be instantiated by the example microprocessor 1200 of FIG. 12 executing machine executable instructions such as those implemented by at least block 320 of FIG. 3. In some examples, the analyzer circuitry 208 may be instantiated by hardware logic circuitry, which may be implemented by an ASIC, XPU, or the FPGA circuitry 1300 of FIG. 13 structured to perform operations corresponding to the machine readable instructions. Additionally or alternatively, the analyzer circuitry 208 may be instantiated by any other combination of hardware, software, and/or firmware. For example, the analyzer circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating a seat diagram. For example, the means for generating a seat diagram may be implemented by seat diagram generator circuitry 210. In some examples, the seat diagram generator circuitry 210 may be instantiated by programmable circuitry such as the example programmable circuitry 1112 of FIG. 11. For instance, the seat diagram generator circuitry 210 may be instantiated by the example microprocessor 1200 of FIG. 12 executing machine executable instructions such as those implemented by at least block 330 of FIG. 3. In some examples, the seat diagram generator circuitry 210 may be instantiated by hardware logic circuitry, which may be implemented by an ASIC, XPU, or the FPGA circuitry 1300 of FIG. 13 structured to perform operations corresponding to the machine readable instructions. Additionally or alternatively, the seat diagram generator circuitry 210 may be instantiated by any other combination of hardware, software, and/or firmware. For example, the seat diagram generator circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the compliance identifier circuitry 130 of FIG. 1 is illustrated in FIG. 2, one or more of the elements, processes and/or devices illustrated in FIG. 2 may be combined, divided, re-arranged, omitted, eliminated and/or implemented in any other way. Further, the example data receiver circuitry 202, the notification generator circuitry 204, the sensor identifier circuitry 206, the analyzer circuitry 208, the seat diagram generator circuitry 210, and/or, more generally, the example compliance identifier circuitry 130 of FIG. 2 may be implemented by hardware, software, firmware and/or any combination of hardware, software and/or firmware. Thus, for example, any of the data receiver circuitry 202, the notification generator circuitry 204, the sensor identifier circuitry 206, the analyzer circuitry 208, the seat diagram generator circuitry 210, and/or, more generally, the example compliance identifier circuitry 130 of FIG. 2 could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s), ASIC(s)), programmable logic device(s) (PLD(s)), and/or field programmable logic device(s) (FPLD(s)) such as FPGAs. Further still, the compliance identifier circuitry 130 of FIG. 2 may include one or more elements, processes, and/or devices in addition to, or instead of, those illustrated in FIG. 2, and/or may include more than one of any or all of the illustrated elements, processes and devices.

Figure 3:
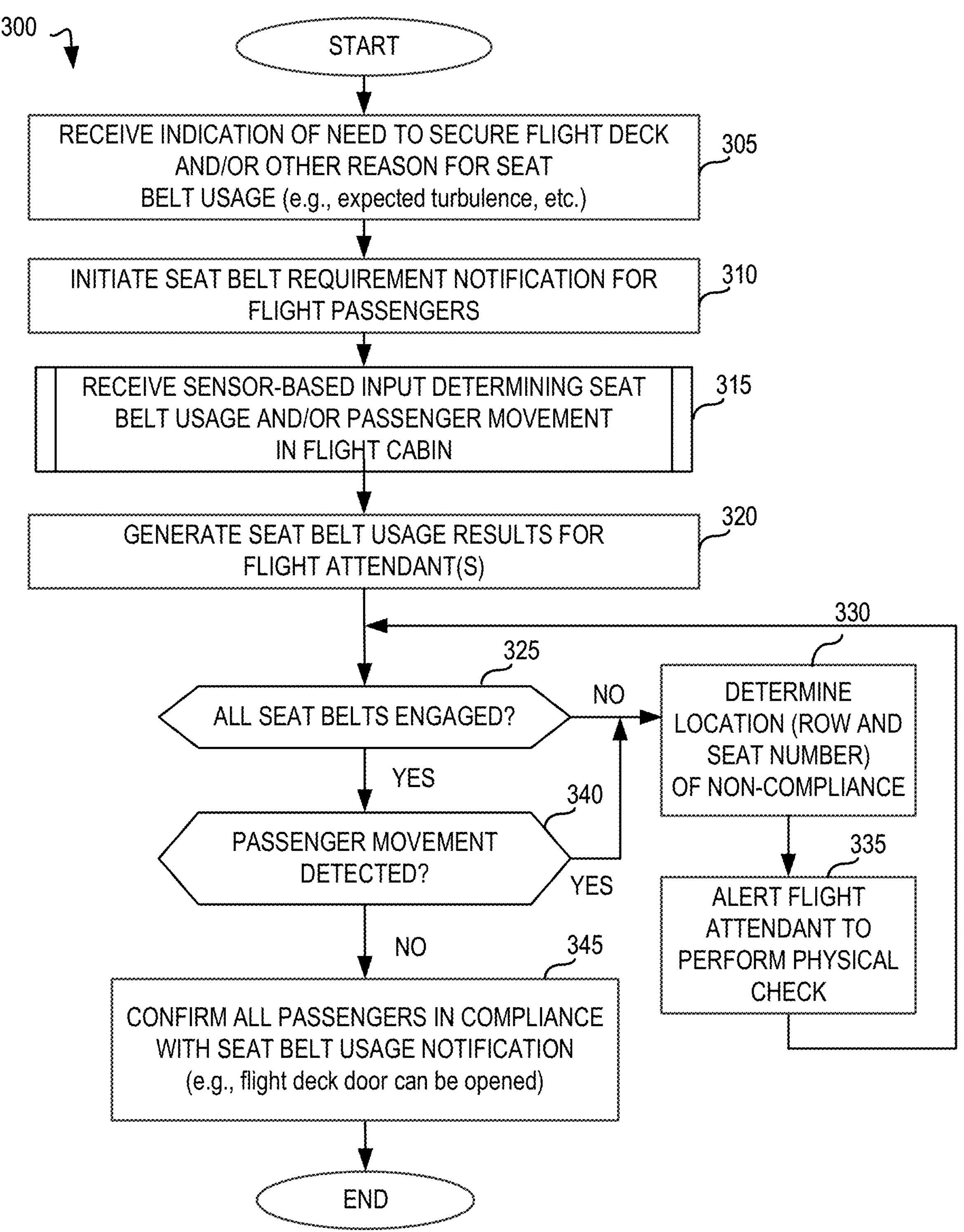
FIG. 3 is a flowchart representative of example machine-readable instructions and/or example operations that may be executed, instantiated, and/or performed by example programmable circuitry to implement the example compliance identifier circuitry of FIG. 2.
Figure 4:
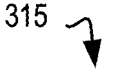
FIG. 4 is a flowchart representative of example machine-readable instructions and/or example operations that may be executed, instantiated, and/or performed by example programmable circuitry to implement the example compliance identifier circuitry of FIG. 2 to receive sensor-based input determining seat belt usage in a flight cabin in accordance with teachings disclosed herein.
Figure 4:
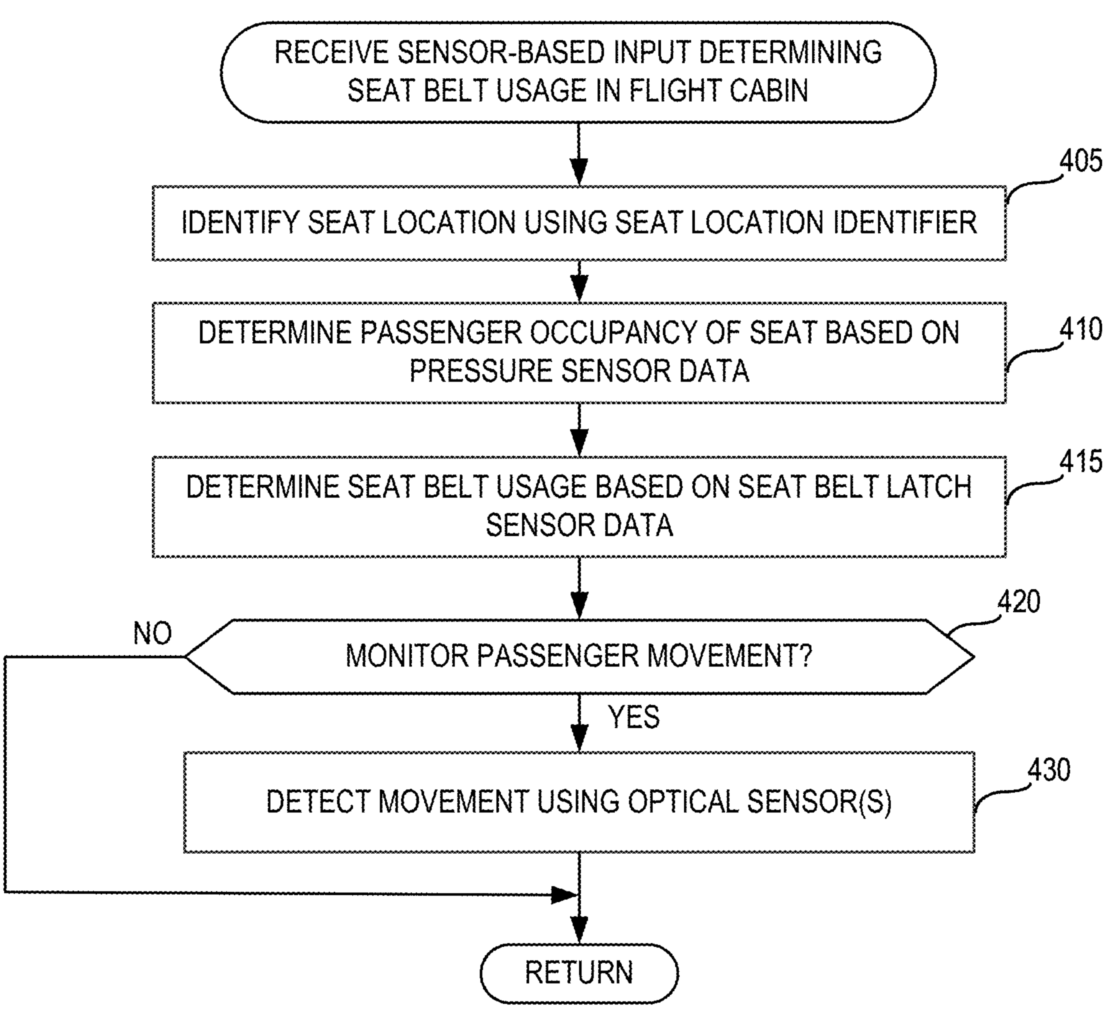

Flowcharts representative of example machine readable instructions, which may be executed by programmable circuitry to implement and/or instantiate the compliance identifier circuitry 130 of FIG. 1 and/or representative of example operations which may be performed by programmable circuitry to implement and/or instantiate the compliance identifier circuitry 130 of FIG. 1, are shown in FIGS. 3-4. The machine readable instructions may be one or more executable programs or portion(s) of one or more executable programs for execution by programmable circuitry, such as the programmable circuitry 1112 shown in the example processor platform 1100 discussed below in connection with FIG. 11 and/or may be one or more function(s) or portion(s) of functions to be performed by the example programmable circuitry (e.g., an FPGA) discussed below in connection with FIGS. 12 and/or 13. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowcharts illustrated in FIGS. 3-4, many other methods of implementing the example compliance identifier circuitry 130 of FIG. 1 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 3-4 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed, instantiated, and/or performed by programmable circuitry to implement the example compliance identifier circuitry 130 of FIG. 1. The machine readable instructions and/or the operations 300 of FIG. 3 begin at block 305, when the data receiver circuitry 202 receives an indication of a need to secure the flight deck and/or other reason for seat belt usage (e.g., expected turbulence, take-off, landing, etc.). For example, the data receiver circuitry 202 receives notification from the pilot or co-pilot that the flight deck needs to be secured (e.g., to allow the pilot or co-pilot to exit the flight deck). In some examples, the data receiver circuitry 202 receives information from the pilot indicating expected flight conditions that require the usage of seat belts. The notification generator circuitry 204 generates a notification to the flight passengers of the aircraft to fasten seat belts, at block 310. In some examples, the notification generator circuitry 204 generates a notification to the pilot and/or co-pilot indicating that the flight deck is in the process of being secured and/or provides updates as to the status of the flight deck area (e.g., flight deck door can be unlocked, etc.). Once a notification requiring passengers to fasten seat belt(s) is completed, the sensor identifier circuitry 206 receives sensor-based input determining seat belt usage compliance throughout the flight cabin, at block 315. In some examples, the sensor identifier circuitry 206 also receives sensor-based input determining passenger seat occupation status (e.g., using pressure sensors located in the passenger seat), as described in more detail in connection with FIG. 4.

The analyzer circuitry 208 determines seat belt usage results based on the sensor output. For example, the analyzer circuitry 208 analyzes in real time the status of seat belt usage (e.g., seat belt fastened, seat belt not fastened, etc.) for each seat in the flight cabin. Flight attendant(s) can monitor the results of the seat belt usage assessment as the seat diagram generator circuitry 210 outputs a seat-by-seat summary of seat belt usage compliance, at block 320. Flight attendant(s) can monitor whether all seat belts are engaged (e.g., fastened) to determine if a visual inspection is necessary, at block 325. If all seat belts are not fastened based on the generated seat diagram, the flight attendant can determine the location (e.g., row and seat number) of non-compliance, at block 330. For example, the seat diagram generator circuitry 210 outputs the seat location information that requires further attention based on the analysis performed by the analyzer circuitry 208. The notification generator circuitry 204 generates an alert indicating the seat(s) where seat belts are not fastened and/or additional inspection is required, at block 335. Likewise, the notification generator circuitry 204 generates an alert when passenger movement is detected in the flight cabin while the flight attendant(s) are working to secure the flight deck. If passenger movement is detected (e.g., using optical sensors), at block 340, the notification generator circuitry 204 generates an alert indicating the passenger seat(s) and/or flight cabin area(s) where movement is detected, at block 330. Such movement notification allows flight attendants to monitor seat belt usage compliance in combination with passenger movement(s) in the flight cabin, therefore allowing for a thorough review and assessment of passenger activity when needed (e.g., prior to unlocking of the flight deck door when a pilot/co-pilot is exiting or re-entering the flight deck). Once flight attendants confirm that all passengers are in their seats with fastened seat belts (e.g., using the generated seat diagram(s) and any necessary visual checks), the notification generator circuitry 204 issues a notification to the pilot and/or co-pilot that all passengers are compliant the seat belt usage requirement, at block 345.

In some examples, the sensor identifier circuitry 206 receives a signal from sensor(s) on the flight deck door. A monitoring system associated with the compliance identifier circuitry 130 provides flight personnel in the flight deck the status of the flight deck door (e.g., using the notification generator circuitry 204). This prevents the flight deck door from being opened when the analyzer circuitry 208 detects an unsecured flight deck status. For example, the compliance identifier circuitry 130 works in unison with sensor(s) on the flight deck door lock (e.g., via the sensor identifier circuitry 206). In some examples, an indicator (e.g., such as a light or audible alarm) can be positioned inside the flight deck. Prior to opening the flight deck door, flight personnel can check status identifier(s) based on output from the compliance identifier circuitry 130. If the analyzer circuitry 208 determines a secure status, the flight deck door can be opened, allowing flight personnel to access a vestibule of the cabin area. If the analyzer circuitry 208 determines an unsecured status, the flight deck door remains closed. For example, this prevents an individual that may be in the vestibule from gaining access to the flight deck. In some examples, the compliance identifier circuitry 130 controls the lock on the flight deck door (e.g., via the sensor identifier circuitry 206). For example, the compliance identifier circuitry 130 maintains an engaged lock (e.g., on the flight deck door) when the analyzer circuitry 208 determines an unsecured flight deck status. The compliance identifier circuitry 130 disengages the lock and allows the flight deck door to be opened when the analyzer circuitry 208 determines a secured flight deck status.

FIG. 4 is a flowchart representative of example machine readable instructions and/or example operations 315 that may be executed, instantiated, and/or performed by programmable circuitry to implement the example compliance identifier circuitry 130 of FIG. 1 to receive sensor-based input determining seat belt usage in the flight cabin. The machine readable instructions and/or the operations 315 of FIG. 3 begin at block 405, when the sensor identifier circuitry 206 identifies seat locations throughout the flight cabin using seat location identifiers, at block 405. In some examples, the sensor identifier circuitry 206 detects seat location identifiers (e.g., RFID transmitters) via RFID-based antennas positioned throughout the flight cabin, as shown in connection with FIG. 6.

In the example of FIG. 4, the sensor identifier circuitry 206 determines passenger occupancy of the identified seat(s) based on pressure sensor outputs, at block 410. For example, the pressure sensor(s) can include sensor contacts evenly distributed on the stress bearing surface of a seat, triggering a signal when an external force presses down on the seat. In some examples, the pressure sensor(s) can be magnetically operated push button sensors with a simple push-fit clip mounting configuration. In the example of FIG. 4, the sensor identifier circuitry 206 also determines seat belt usage based on seat belt latch sensor data, at block 415. In some examples, seat belt latch sensors can include a reed switch sensor to detect when a seat belt is engaged (e.g., the seat belt latch sensor is a magnetically operated position sensor integrated into the seat belt buckle). In some examples, seat belt locking sensor(s), seat occupation detection sensor(s), and/or seat location identifier sensor(s) can transmit data via passive or active (e.g., battery-based power, etc.) RFID transmitters at each seat to the data storage 212 of FIG. 2. In some examples, the sensor identifier circuitry 206 transmits data related to passenger movement when passenger movement monitoring is needed, at block 420. For example, to secure the flight deck, passenger monitoring can involve identification of passenger movement throughout the flight cabin, in addition to the presence of the passenger(s) in their seat(s) and/or the usage of seat belts at those seat(s). In some examples, the sensor identifier circuitry 206 detects movement using optical sensor(s) positioned throughout the flight cabin, at block 430. For example, the optical sensor(s) can include light detection and ranging (LiDAR)-based sensors. However, any other type of object detection and/or movement identification sensor can be used to determine passenger movement in the flight cabin.

Figure 5:
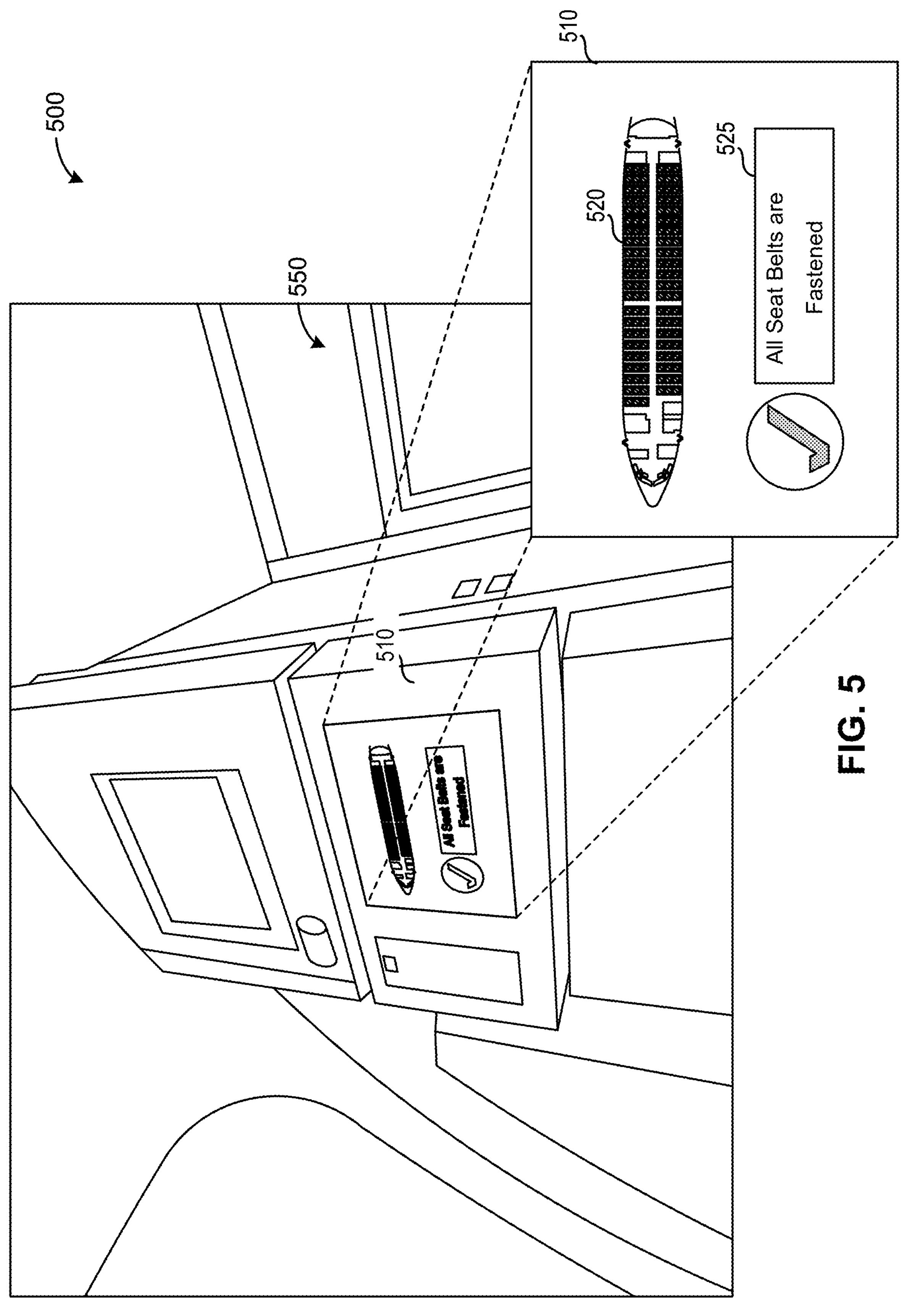
FIG. 5 illustrates an example monitor positioned within a flight cabin to permit flight attendants to monitor passenger movement and/or seatbelt usage compliance based on sensor-generated feedback originating from the passengers' seats.

FIG. 5 illustrates an example monitor positioned within a flight cabin 500 of the aircraft 100 to permit flight attendants to monitor passenger movement and/or seatbelt usage compliance based on sensor-generated feedback originating from the passengers' seats. In the example of FIG. 5, the flight cabin 500 includes a monitor 510 displaying a seat-by-seat diagram 520 and a corresponding notification 525 associated with the assessment of seat belt usage throughout the flight cabin. In the example of FIG. 5, the flight cabin includes a flight deck door 550 securing the flight deck from the rest of the flight cabin 500. In the examples disclosed herein, the flight deck door 550 can be unlocked when all passengers are positioned in their seats with the seat belts fastened.

Figure 6:
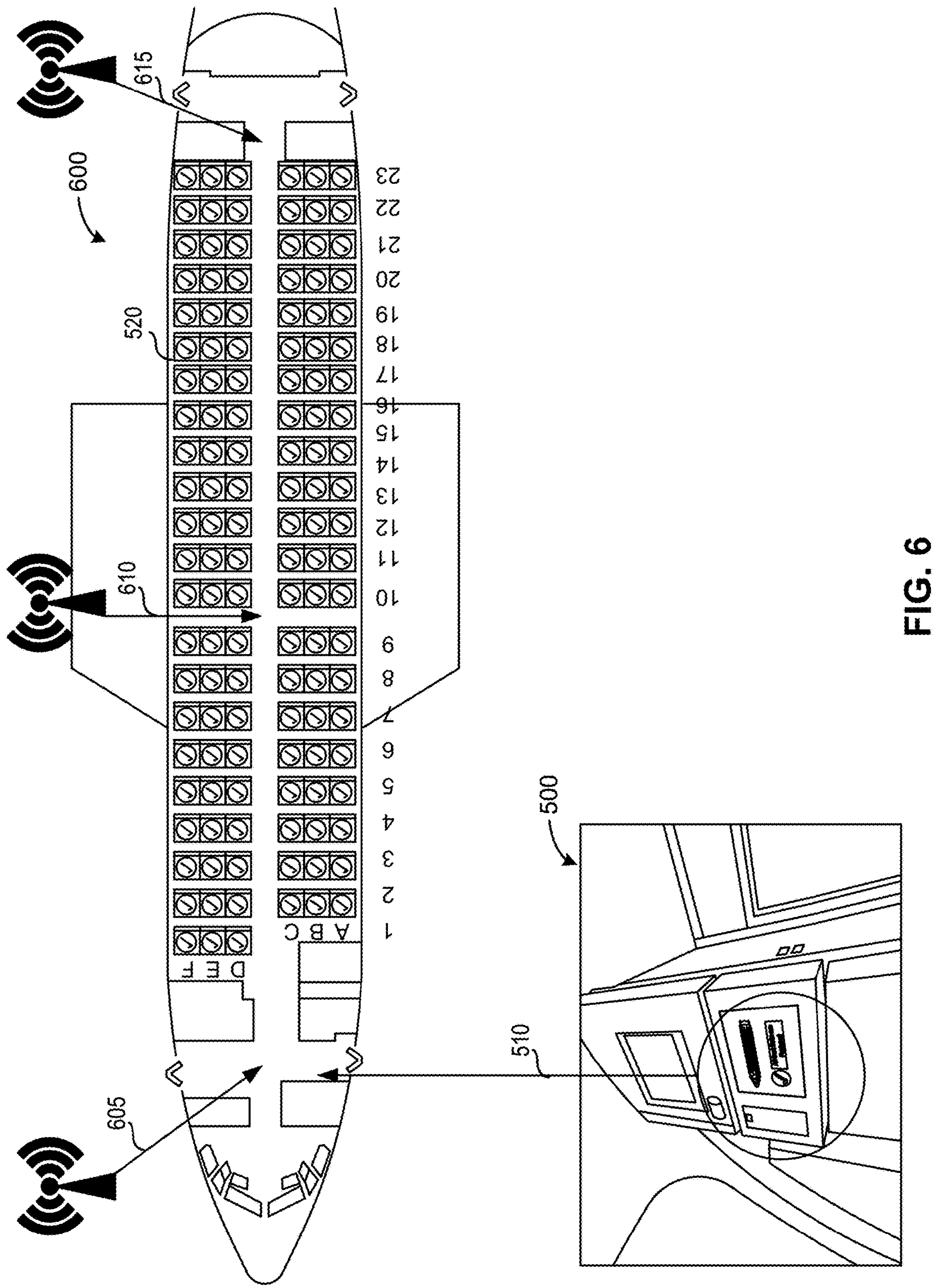
FIG. 6 illustrates an example positioning of antennas (e.g., radio frequency identification (RFID) antennas) throughout a flight cabin to receive data from RFID transmitters located in the flight cabin seats.

FIG. 6 illustrates an example positioning 600 of antennas 605, 610, 615 (e.g., radio frequency identification (RFID) antennas) throughout the flight cabin 500 to receive data from RFID transmitters located in the flight cabin seats. In the example of FIG. 6, the monitor 510 is shown positioned towards the front of the aircraft 100. The RFID antennas 605, 610, 615 can be positioned towards the front of the aircraft flight cabin 500 (e.g., antenna 605), towards the middle of the flight cabin 500 (e.g., antenna 610), and/or towards the back of the flight cabin 500 (e.g., antenna 615). For example, the RFID antennas can receive data from RFID transmitters at the individual flight cabin passenger seats (e.g., including data from seat occupation sensors, passenger movement sensors, seat belt lock sensors, etc.).

Figure 7:
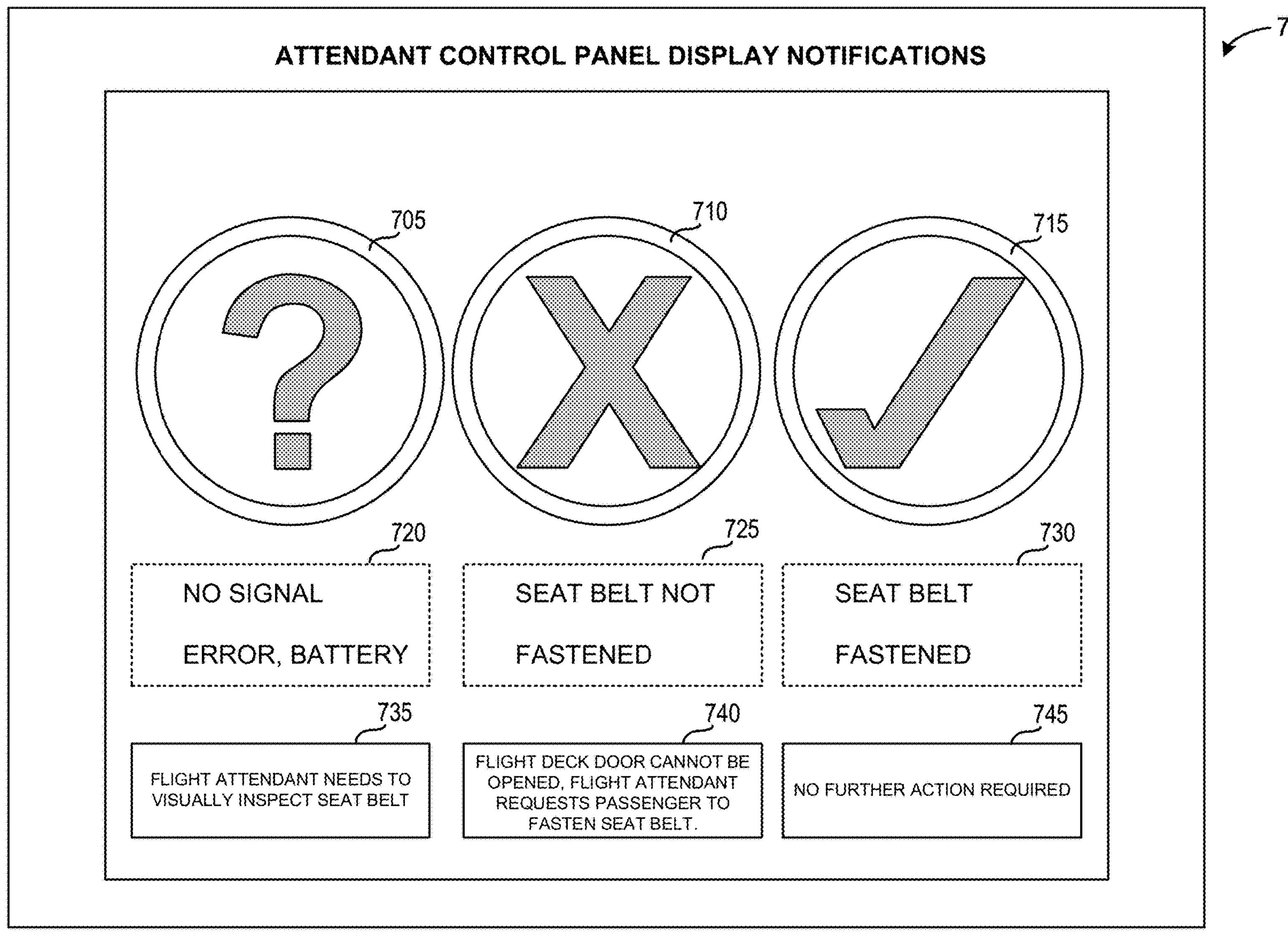
FIG. 7 illustrates an example graphical representation of attendant control panel display notifications generated in accordance with the instructions of FIGS. 3 and/or 4.

FIG. 7 illustrates an example graphical representation of attendant control panel display notifications 700 generated in accordance with the instructions 300, 315 of FIGS. 3 and/or 4. For example, the attendant control panel display notifications 700 include visual indicators 705, 710, 715 showing seat belt usage status, corresponding verbal notifications 720, 725, 730 and/or flight attendant instructions 735, 740, 745. For example, visual indicator 705 includes an accompanying verbal indicator 720 indicating that there is no signal (e.g., from an RFID antenna receiving sensor-based data requiring a battery change, etc.) and the flight attendant instructions 735 (e.g., indicating that a visual inspection at the given passenger seat is needed). Likewise, the visual indicator 710 includes an accompanying verbal indicator 725 indicating that the seat belt is not fastened and the flight attendant instructions 740 (e.g., check to make sure passenger secures seat belt before flight deck door can be opened). In the example of FIG. 7, an additional visual indicator 715 includes an accompanying verbal indicator 730 indicating that the seat belt is fastened and the flight attendant instructions 745 (e.g., no further action needed).

Figure 8:
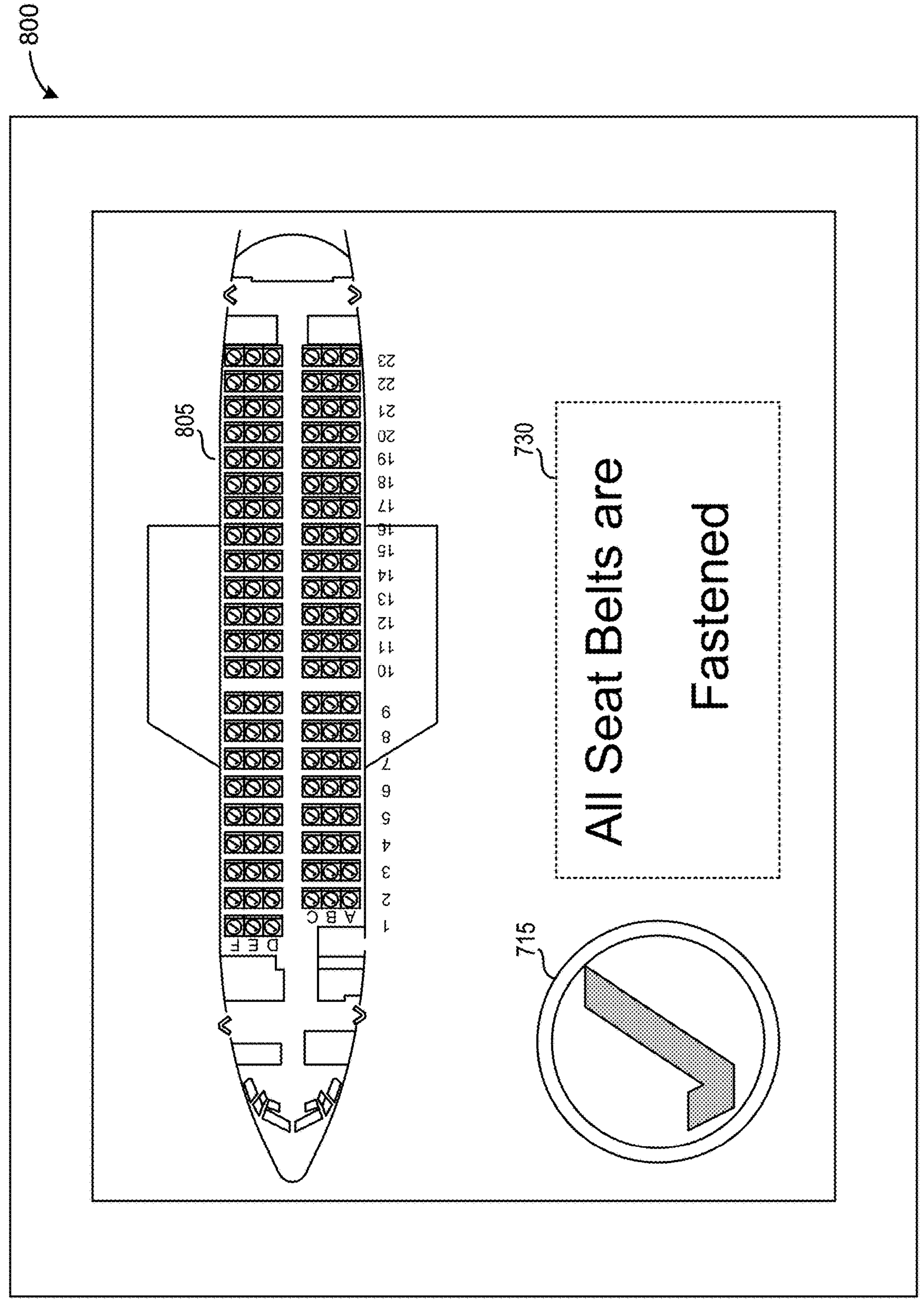
FIG. 8 illustrates an example graphical representation of a notification indicating that all seat-belts are fastened, with a seat-by-seat assessment of the seat-belt compliance.

FIG. 8 illustrates an example graphical representation 800 of a notification indicating that all seat belts are fastened, with a seat-by-seat assessment of the seat-belt compliance. In the example of FIG. 8, the seat diagram 520 of FIG. 5 (e.g., generated by the seat diagram generator circuitry 210) includes a visual indication 805 that all seats have fastened seat belts. As a result, the corresponding visual indicator 715 and verbal notification 730 also indicate that all seat belts are fastened.

Figure 9:
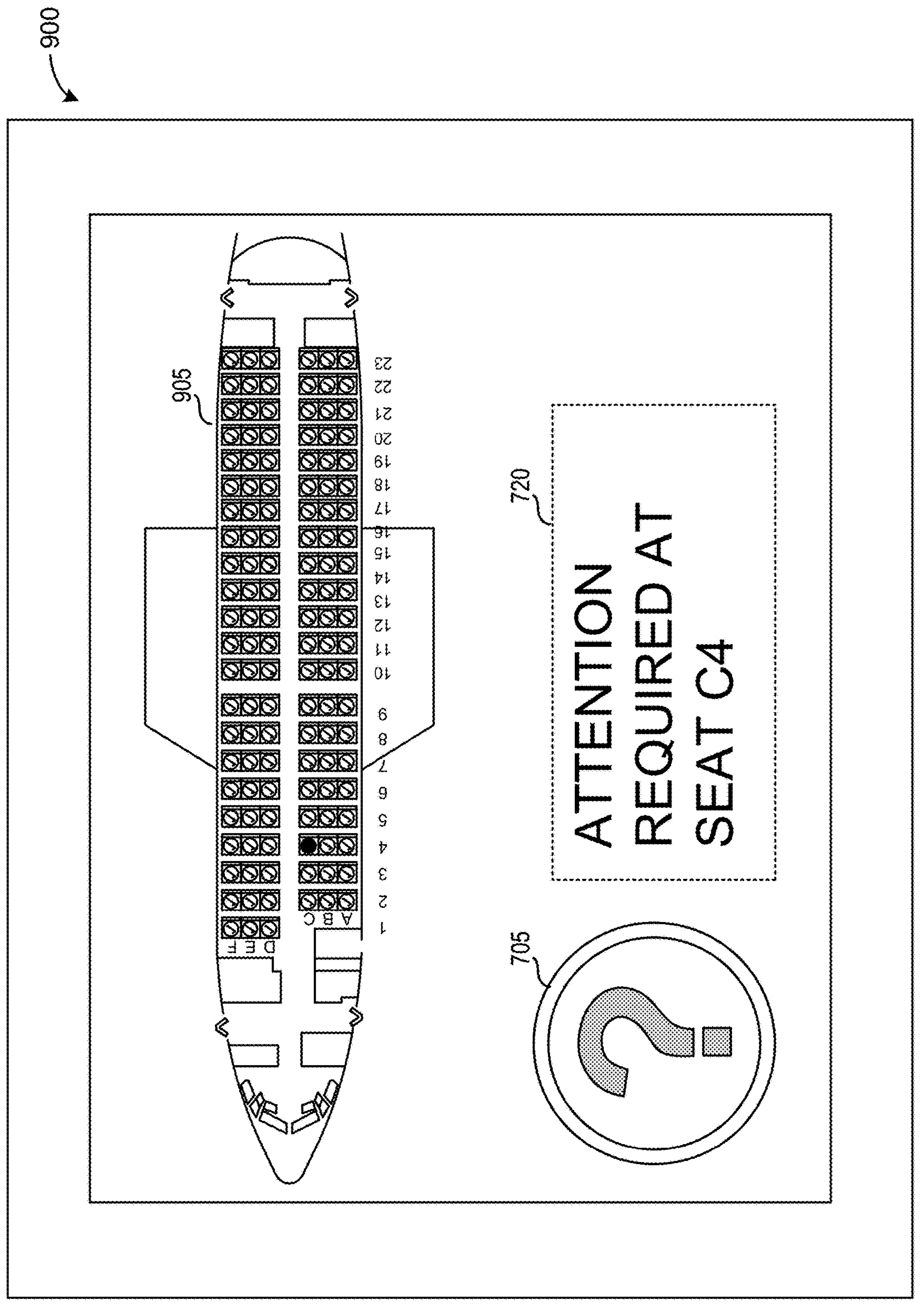
FIG. 9 illustrates an example graphical representation of a notification indicating passenger seats where flight attendant attention is required, with a seat-by-seat assessment of the seat-belt compliance.

FIG. 9 illustrates an example graphical representation 900 of a notification indicating passenger seats where flight attendant attention is required, with a seat-by-seat assessment of the seat-belt compliance. In the example of FIG. 9, the seat diagram 520 of FIG. 5 (e.g., generated by the seat diagram generator circuitry 210) includes a visual indication 905 that attention is required at a particular seat of the flight cabin. As a result, the corresponding visual indicator 705 and verbal notification 720 also indicate that flight attendant attention is required (e.g., at seat location C4).

Figure 10:
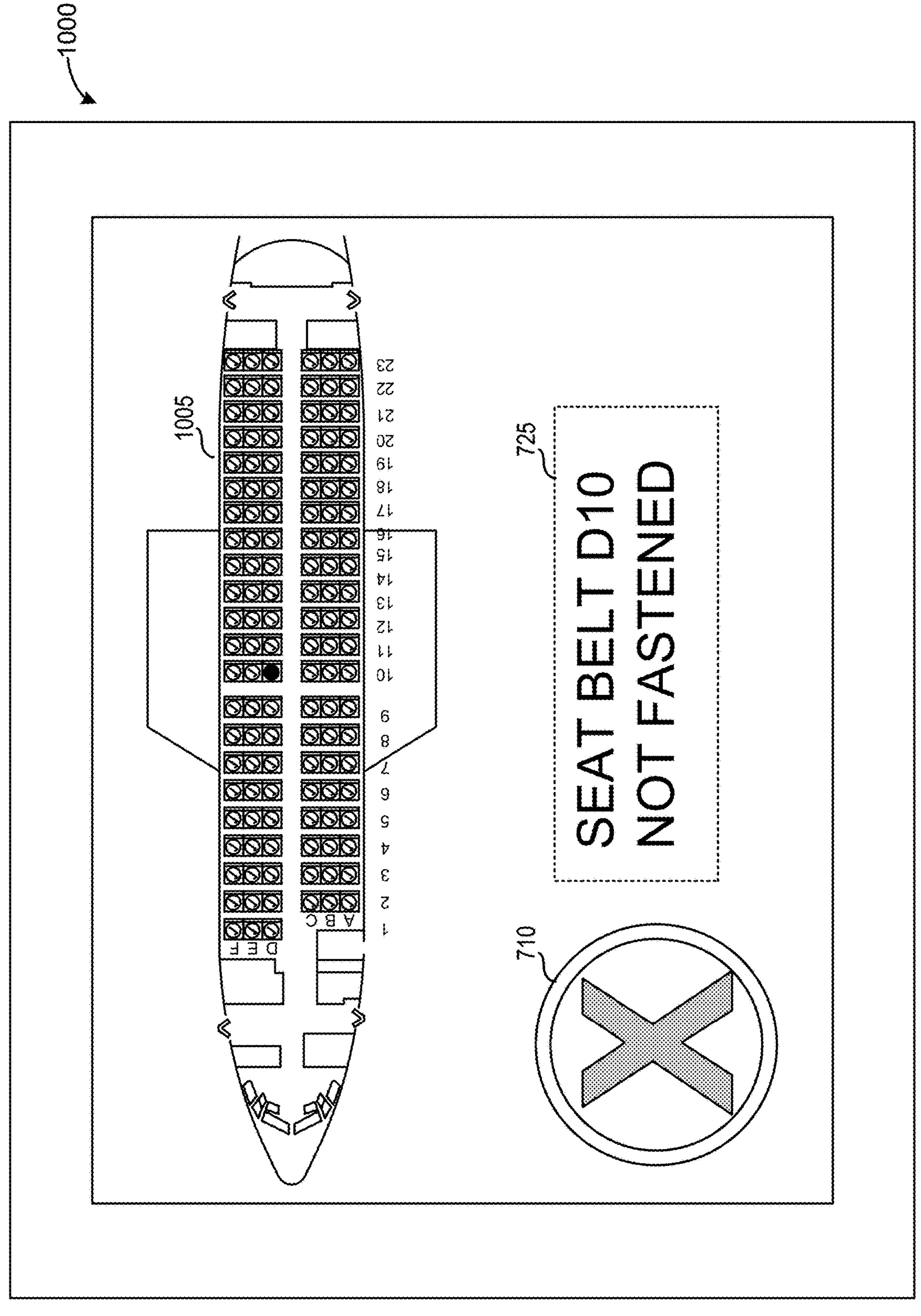
FIG. 10 illustrates an example graphical representation of a notification indicating passenger seats where a seat belt is not fastened, with a seat-by-seat assessment of the seat-belt compliance.

FIG. 10 illustrates an example graphical representation 1000 of a notification indicating passenger seats where a seat belt is not fastened, with a seat-by-seat assessment of the seat-belt compliance. In the example of FIG. 10, the seat diagram 520 of FIG. 5 (e.g., generated by the seat diagram generator circuitry 210) includes a visual indication 1005 that a passenger seat location does not have a fastened seat belt. As a result, the corresponding visual indicator 710 and verbal notification 725 also indicate that a particular seat belt is not fastened (e.g., at seat location D10).

Figure 11:
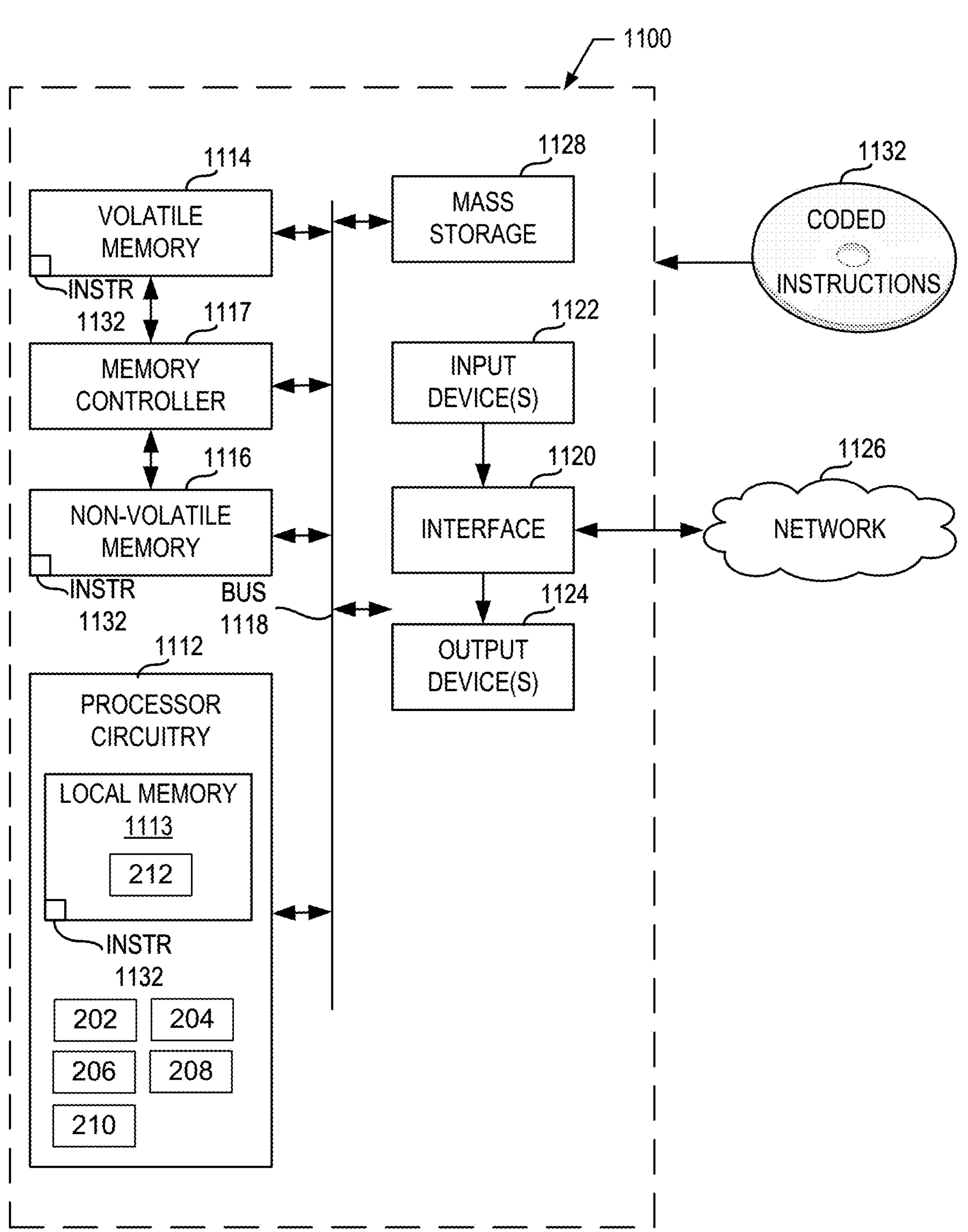
FIG. 11 is a block diagram of an example processing platform including programmable circuitry structured to execute, instantiate, and/or perform the example machine readable instructions and/or perform the example operations of FIGS. 3-4 to implement the compliance identifier circuitry of FIG. 2.

FIG. 11 is a block diagram of an example programmable circuitry platform 1100 structured to execute and/or instantiate the example machine-readable instructions and/or the example operations of FIGS. 3-4 to implement the example compliance identifier circuitry 130. The programmable circuitry platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1100 of the illustrated example includes programmable circuitry 1112. The programmable circuitry 1112 of the illustrated example is hardware. For example, the programmable circuitry 1112 can be implemented by one or more integrated circuits, logic circuits, FPGAs microprocessors, CPUs, GPUs, DSPs, and/or microcontrollers from any desired family or manufacturer. The programmable circuitry 1112 may be implemented by one or more semiconductor based (e.g., silicon based) devices. In this example, the processor circuitry 1112 implements the data receiver circuitry 202, the notification generator circuitry 204, the sensor identifier circuitry 206, the analyzer circuitry 208, and/or the seat diagram generator circuitry 210.

The programmable circuitry 1112 of the illustrated example includes a local memory 1113 (e.g., a cache, registers, etc.). The programmable circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117. In some examples, the memory controller 1117 may be implemented by one or more integrated circuits, logic circuits, microcontrollers from any desired family or manufacturer, or any other type of circuitry to manage the flow of data going to and from the main memory 1114, 1116.

The programmable circuitry platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user (e.g., a human user, a machine user, etc.) to enter data and/or commands into the programmable circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The programmable circuitry platform 1100 of the illustrated example also includes one or more mass storage devices 1128 to store software and/or data. Examples of such mass storage devices 1128 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine executable instructions 1132, which may be implemented by the machine readable instructions of FIGS. 3 and/or 4, may be stored in the mass storage device 1128, in the volatile memory 1114, in the non-volatile memory 1116, and/or on at least one non-transitory computer readable storage medium such as a CD or DVD which may be removable.

Figure 12:
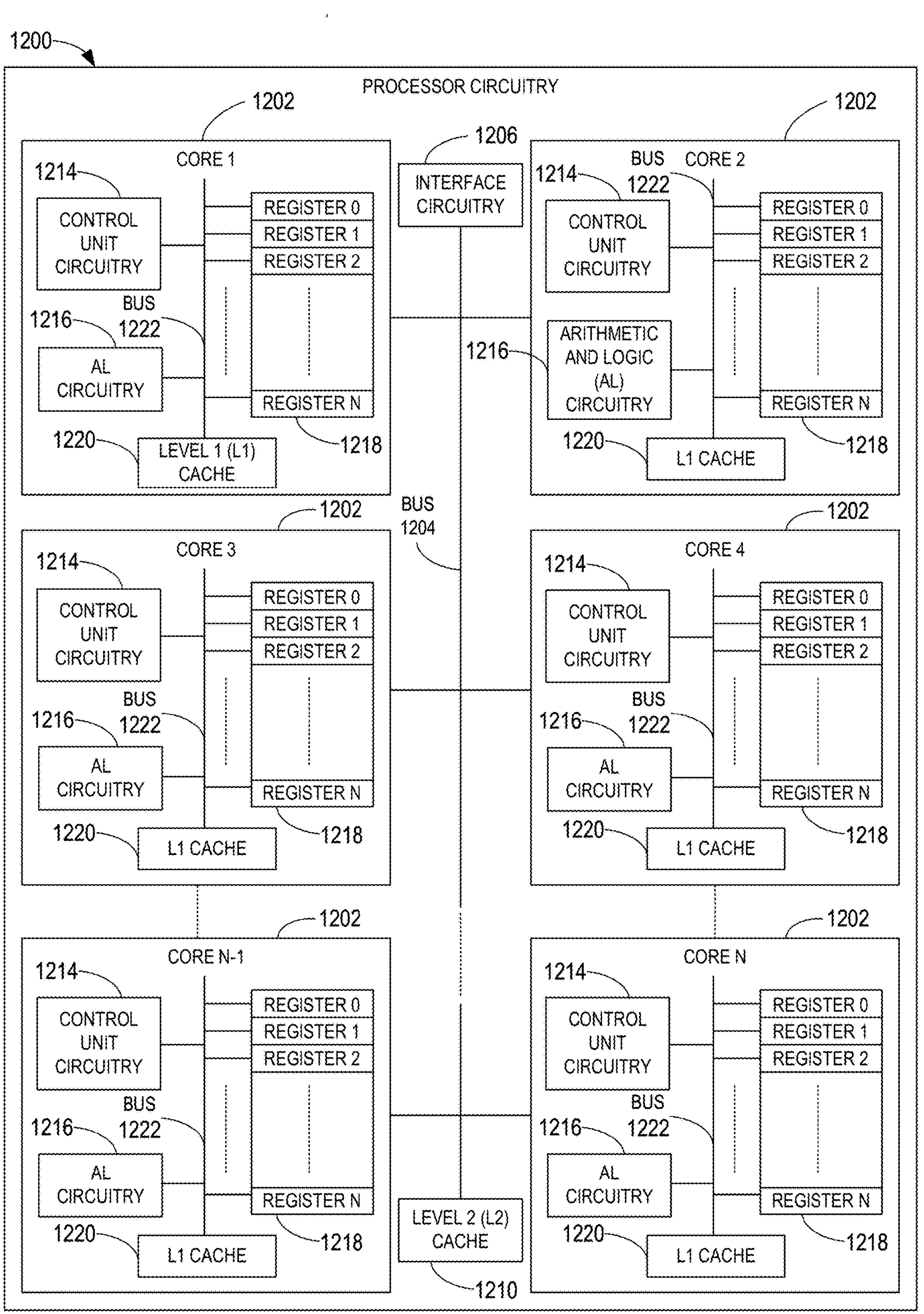
FIG. 12 is a block diagram of an example implementation of the programmable circuitry of FIG. 11.

FIG. 12 is a block diagram of an example implementation of the programmable circuitry 1112 of FIG. 11. In this example, the programmable circuitry 1112 of FIG. 11 is implemented by a microprocessor 1200. For example, the microprocessor 1200 may be a general purpose microprocessor (e.g., general purpose microprocessor circuitry). The microprocessor 1200 executes some or all of the machine readable instructions of the flowchart of FIGS. 3 and/or 4 to effectively instantiate the circuitry of FIG. 2 logic circuits to perform the operations corresponding to those machine readable instructions. In some such examples, the circuitry of FIG. 2 is instantiated by the hardware circuits of the microprocessor 1200 in combination with the instructions. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 3 and/or 4.

The cores 1202 may communicate by a first example bus 1204. In some examples, the first bus 1204 may implement a communication bus to effectuate communication associated with one(s) of the cores 1202. For example, the first bus 1204 may implement at least one of an Inter-Integrated Circuit (I2C) bus, a Serial Peripheral Interface (SPI) bus, a PCI bus, or a PCIe bus. Additionally or alternatively, the first bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_ cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer-based operations. In other examples, the AL circuitry 1216 also performs floating-point operations. In yet other examples, the AL circuitry 1216 may include first AL circuitry that performs integer-based operations and second AL circuitry that performs floating point operations. In some examples, the AL circuitry 1216 may be referred to as an Arithmetic Logic Unit (ALU).

The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may be implemented by at least one of an I2C bus, a SPI bus, a PCI bus, or a PCIe bus.

Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages.

The microprocessor 1200 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1200, in the same chip package as the microprocessor 1200 and/or in one or more separate packages from the microprocessor 1200.

Figure 13:
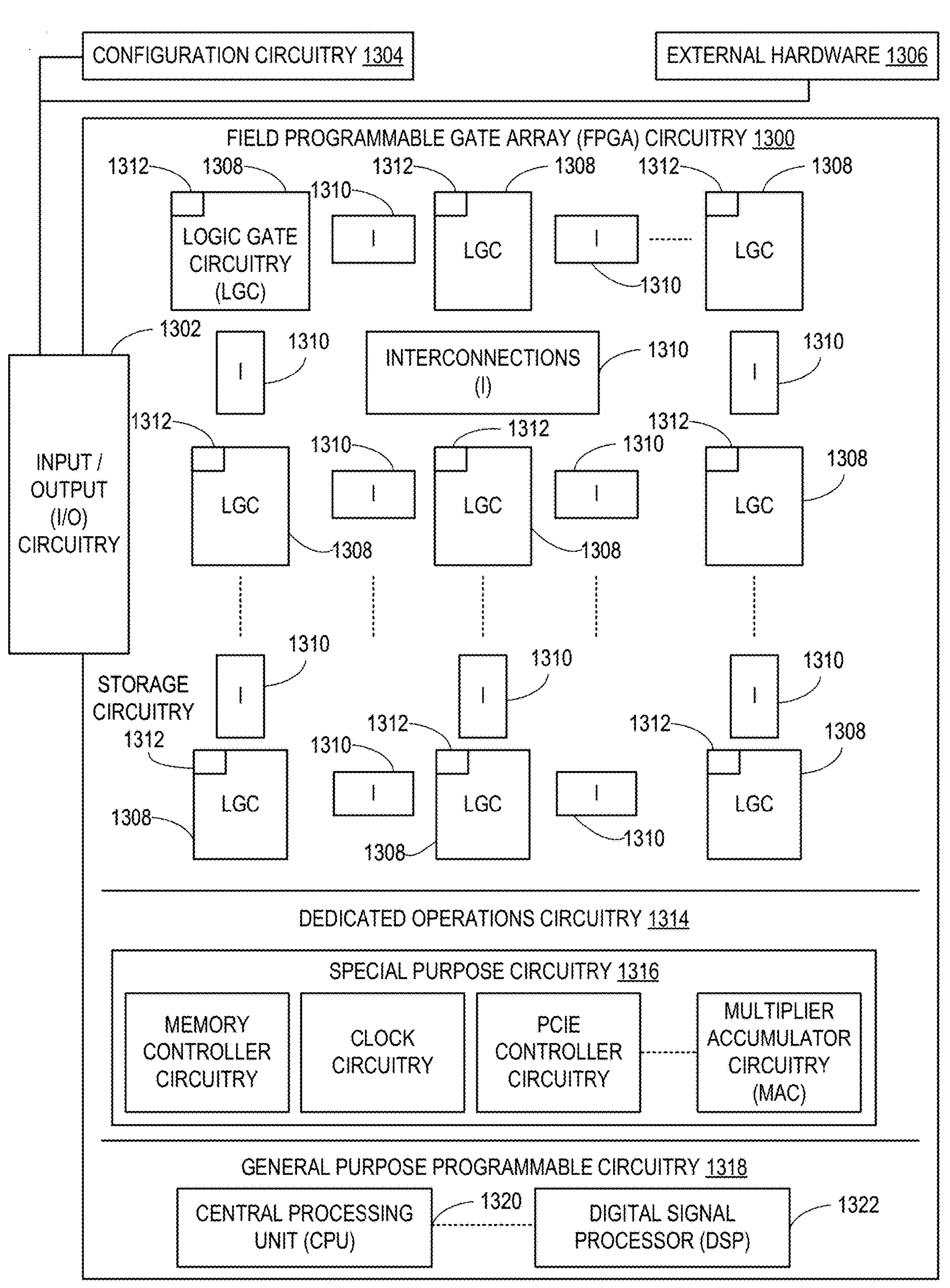
FIG. 13 is a block diagram of another example implementation of the programmable circuitry of FIG. 11.

FIG. 13 is a block diagram of another example implementation of the programmable circuitry of FIG. 11. In this example, the programmable circuitry 1112 is implemented by FPGA circuitry 1300. For example, the FPGA circuitry 1300 may be implemented by an FPGA. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 3 and/or 4 but whose interconnections and logic circuitry are fixed once fabricated), the FPGA circuitry 1300 of the example of FIG. 13 includes interconnections and logic circuitry that may be configured, structured, programmed, and/or interconnected in different ways after fabrication to instantiate, for example, some or all of the operations/functions corresponding to the machine readable instructions represented by the flowcharts of FIGS. 3 and/or 4. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the instructions (e.g., the software and/or firmware) represented by the flowcharts of FIGS. 3 and/or 4. As such, the FPGA circuitry 1300 may be configured and/or structured to effectively instantiate some or all of the operations/functions corresponding to the machine readable instructions of the flowcharts of FIGS. 3 and/or 4 as dedicated logic circuits to perform the operations/functions corresponding to those software instructions in a dedicated manner analogous to an ASIC. Therefore, the FPGA circuitry 1300 may perform the operations/functions corresponding to the some or all of the machine readable instructions of FIGS. 3 and/or 4 faster than the general-purpose microprocessor can execute the same.

In the example of FIG. 13, the FPGA circuitry 1300 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1300 of FIG. 13 may access and/or load the binary file to cause the FPGA circuitry 1300 of FIG. 13 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1300 of FIG. 13 to cause configuration and/or structuring of the FPGA circuitry 1300 of FIG. 13, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1300 of FIG. 13 may access and/or load the binary file to cause the FPGA circuitry 1300 of FIG. 13 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1300 of FIG. 13 to cause configuration and/or structuring of the FPGA circuitry 1300 of FIG. 13, or portion(s) thereof.

The FPGA circuitry 1300 of FIG. 13, includes example input/output (I/O) circuitry 1302 to obtain and/or output data to/from example configuration circuitry 1304 and/or external hardware 1306. For example, the configuration circuitry 1304 may be implemented by interface circuitry that may obtain a binary file, which may be implemented by a bit stream, data, and/or machine-readable instructions, to configure the FPGA circuitry 1300, or portion(s) thereof. In some such examples, the configuration circuitry 1304 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1306 may be implemented by external hardware circuitry. For example, the external hardware 1306 may be implemented by the microprocessor 1200 of FIG. 12.

The FPGA circuitry 1300 also includes an array of example logic gate circuitry 1308, a plurality of example configurable interconnections 1310, and example storage circuitry 1312. The logic gate circuitry 1308 and the configurable interconnections 1310 are configurable to instantiate one or more operations/functions that may correspond to at least some of the machine readable instructions of FIGS. 3-4 and/or other desired operations. The logic gate circuitry 1308 shown in FIG. 13 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations/functions. The logic gate circuitry 1308 may include other electrical structures such as look-up tables (LUTs), registers (e.g., flip-flops or latches), multiplexers, etc.

The configurable interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example dedicated operations circuitry 1314. In this example, the dedicated operations circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the programmable circuitry 1112 of FIG. 11, many other approaches are contemplated. For example, FPGA circuitry may include an on-board CPU, such as one or more of the example CPU 1320 of FIG. 13. Therefore, the programmable circuitry 1112 of FIG. 11 may additionally be implemented by combining at least the example microprocessor 1200 of FIG. 12 and the example FPGA circuitry 1300 of FIG. 13. In some such hybrid examples, one or more cores 1202 of FIG. 12 may execute a first portion of the machine readable instructions represented by the flowchart(s) of FIGS. 3-4 to perform first operation(s)/function(s), the FPGA circuitry 1300 of FIG. 13 may be configured and/or structured to perform second operation(s)/function(s) corresponding to a second portion of the machine readable instructions represented by the flowcharts of FIG. 3-4, and/or an ASIC may be configured and/or structured to perform third operation(s)/function(s) corresponding to a third portion of the machine readable instructions represented by the flowcharts of FIGS. 3-4.

It should be understood that some or all of the circuitry of FIG. 2 may, thus, be instantiated at the same or different times. For example, same and/or different portion(s) of the microprocessor 1200 of FIG. 12 may be programmed to execute portion(s) of machine-readable instructions at the same and/or different times. In some examples, same and/or different portion(s) of the FPGA circuitry 1300 of FIG. 13 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 1200 of FIG. 12 may execute machine readable instructions in one or more threads executing concurrently and/or in series. In some examples, the FPGA circuitry 1300 of FIG. 13 may be configured and/or structured to carry out operations/functions concurrently and/or in series. Moreover, in some examples, some or all of the circuitry of FIG. 2 may be implemented within one or more virtual machines and/or containers executing on the microprocessor 1200 of FIG. 12.

In some examples, the programmable circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the programmable circuitry 1112 of FIG. 11 which may be in one or more packages. For example, the XPU may include a CPU (e.g., the microprocessor 1200 of FIG. 12, the CPU 1320 of FIG. 13, etc.) in one package, a DSP (e.g., the DSP 1322 of FIG. 13) in another package, a GPU in yet another package, and an FPGA (e.g., the FPGA circuitry 1300 of FIG. 13) in still yet another package.

Figure 14:
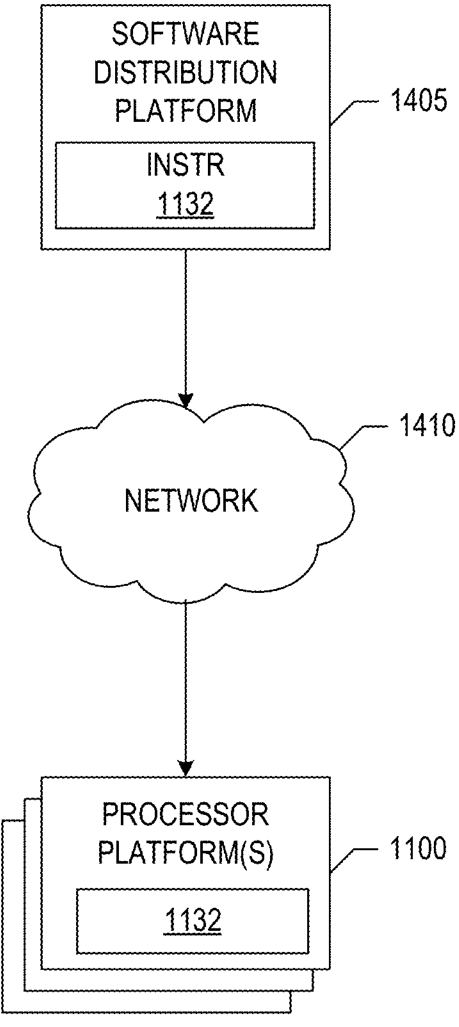
FIG. 14 is a block diagram of an example software/firmware/instructions distribution platform (e.g., one or more servers) to distribute software, instructions, and/or firmware (e.g., corresponding to the example machine readable instructions of FIGS. 3 and/or 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to other hardware devices (e.g., hardware devices owned and/or operated by third parties from the owner and/or operator of the software distribution platform) is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions of FIGS. 3-4, as described above. The one or more servers of the example software distribution platform 1405 are in communication with an example network 1410, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions of FIG. 3-4, may be downloaded to the example programmable circuitry platform 1100, which is to execute the machine readable instructions 1132 to implement the compliance identifier circuitry 130 of FIG. 2. In some examples, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices. Although referred to as software above, the distributed "software" could alternatively be firmware.

From the foregoing, it will be appreciated that example systems, methods, apparatus, and articles of manufacture have been disclosed that permit monitoring of passenger movement throughout the main cabin, thus eliminating the need for a physical secondary security barrier on commercial airplanes. In examples disclosed herein, seat belt locking sensors, coupled with seat occupied sensors and/or seat location identifiers can be used for transferring data to a central database onboard an airplane. In examples disclosed herein, an attendant control panel receives the seat belt locking, seat occupied and/or seat location data and displays this information/status to the flight attendant. For example, seat belt latch sensors and pressure sensors (e.g., positioned in a seat base) can be integrated and data obtained from these sensors transmitted to a central database for use as real-time data by flight attendants (e.g., using a seat-based layout graphic). As such, methods and apparatus disclosed herein are applicable to any type of vehicle, including a spacecraft, a rotorcraft, a satellite, a terrestrial vehicle, a surface waterborne vehicle, a sub-surface waterborne vehicle, a hovercraft, and/or combinations thereof.

Example methods and apparatus for verifying cabin and flight deck security are disclosed herein. Further examples and combinations thereof include the following:

Example 1 includes an apparatus, comprising interface circuitry, machine readable instructions, and programmable circuitry to at least one of instantiate or execute the machine readable instructions to receive output from an identifier, the identifier associated with a location of a passenger seat on an aircraft, receive output from a seat belt latch sensor, the seat belt latch sensor associated with a seat belt of the passenger seat, determine a usage status of the seat belt at the location of the passenger seat, and generate a seat diagram, the seat diagram including the usage status of the seat belt at the location of the passenger seat.

Example 2 includes the apparatus of example 1, wherein the programmable circuitry is to determine occupancy of the passenger seat using a pressure sensor.

Example 3 includes the apparatus of example 1, wherein the programmable circuitry is to detect passenger movement using an optical sensor.

Example 4 includes the apparatus of example 1, wherein the programmable circuitry is to receive output from the identifier, the seat belt latch sensor, or a pressure sensor using at least one radio frequency identification antenna.

Example 5 includes the apparatus of example 1, wherein the programmable circuitry is to receive output from the seat belt latch sensor in response to a notification to secure a flight deck of an aircraft.

Example 6 includes the apparatus of example 1, wherein the programmable circuitry is to engage a locking feature to maintain the seat belt in a locked state during at least one of a taxi, takeoff, or landing of the aircraft.

Example 7 includes the apparatus of example 1, wherein the programmable circuitry is to engage an automatic safety override to release the locking feature when acceleration of the aircraft exceeds a predetermined threshold.

Example 8 includes a method, comprising receiving output from an identifier, the identifier associated with a location of a passenger seat on an aircraft, receiving output from a seat belt latch sensor, the seat belt latch sensor associated with a seat belt of the passenger seat, determining a usage status of the seat belt at the location of the passenger seat, and generating a seat diagram, the seat diagram including the usage status of the seat belt at the location of the passenger seat.

Example 9 includes the method of example 8, further including determining occupancy of the passenger seat using a pressure sensor.

Example 10 includes the method of example 8, further including detecting passenger movement using an optical sensor.

Example 11 includes the method of example 8, further including receiving output from the identifier, the seat belt latch sensor, or a pressure sensor using at least one radio frequency identification antenna.

Example 12 includes the method of example 8, further including receiving output from the seat belt latch sensor in response to a notification to secure a flight deck of an aircraft.

Example 13 includes the method of example 8, further including engaging a locking feature to maintain the seat belt in a locked state during at least one of a taxi, takeoff, or landing of the aircraft.

Example 14 includes the method of example 8, further including engaging an automatic safety override to release the locking feature when acceleration of the aircraft exceeds a predetermined threshold.

Example 15 includes a non-transitory machine readable storage medium comprising instructions to cause programmable circuitry to at least receive output from an identifier, the identifier associated with a location of a passenger seat on an aircraft, receive output from a seat belt latch sensor, the seat belt latch sensor associated with a seat belt of the passenger seat, determine a usage status of the seat belt at the location of the passenger seat, and generate a seat diagram, the seat diagram including the usage status of the seat belt at the location of the passenger seat.

Example 16 includes the machine readable storage medium as defined in example 15, wherein the instructions, when executed, cause the programmable circuitry to determine occupancy of the passenger seat using a pressure sensor.

Example 17 includes the machine readable storage medium as defined in example 15, wherein the instructions, when executed, cause the programmable circuitry to detect passenger movement using an optical sensor.

Example 18 includes the machine readable storage medium as defined in example 15, wherein the instructions, when executed, cause the programmable circuitry to receive output from the identifier, the seat belt latch sensor, or a pressure sensor using at least one radio frequency identification antenna.

Example 19 includes the machine readable storage medium as defined in example 15, wherein the instructions, when executed, cause the programmable circuitry to engage a locking feature to maintain the seat belt in a locked state during at least one of a taxi, takeoff, or landing of the aircraft.

Example 20 includes the machine readable storage medium as defined in example 15, wherein the instructions, when executed, cause the programmable circuitry to engage an automatic safety override to release the locking feature when acceleration of the aircraft exceeds a predetermined threshold.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus, comprising:

interface circuitry communicatively coupled to at least one radio frequency identification (RFID) antenna;

machine readable instructions; and programmable circuitry to at least one of instantiate or execute the machine readable instructions to:

receive first output from an identifier via the at least one RFID antenna, the identifier associated with a location of a passenger seat on an aircraft;

receive second output from a seat belt latch sensor via the at least one RFID antenna, the seat belt latch sensor associated with a seat belt of the passenger seat;

receive third output from an occupancy sensor via the at least one RFID antenna, the occupancy sensor associated with the passenger seat;

determine a usage status of the seat belt at the location of the passenger seat based on the first, second and third outputs;

generate a seat diagram, the seat diagram including the usage status of the seat belt at the location of the passenger seat; and generate an alert based on the second output indicating that the seat belt is not latched and the third output indicating that the seat is occupied.

2. The apparatus of claim 1, wherein the programmable circuitry is to determine occupancy of the passenger seat using a pressure sensor.

3. The apparatus of claim 1, wherein the programmable circuitry is to detect passenger movement using an optical sensor.

4. The apparatus of claim 1, wherein the programmable circuitry is to receive fourth output from the seat belt latch sensor in response to a notification to secure a flight deck of an aircraft.

5. The apparatus of claim 1, wherein the programmable circuitry is to engage a locking feature to maintain the seat belt in a locked state during at least one of a taxi, takeoff, or landing of the aircraft.

6. The apparatus of claim 5, wherein the programmable circuitry is to engage an automatic safety override to release the locking feature when acceleration of the aircraft exceeds a predetermined threshold.

7. A method, comprising:

receiving first output from an identifier via at least one RFID antenna, the identifier associated with a location of a passenger seat on an aircraft;

receiving second output from a seat belt latch sensor via the at least one RFID antenna, the seat belt latch sensor associated with a seat belt of the passenger seat;

receiving third output from an occupancy sensor via the at least one RFID antenna, the occupancy sensor associated with the passenger seat;

determining a usage status of the seat belt at the location of the passenger seat based on the first, second and third outputs;

generating a seat diagram, the seat diagram including the usage status of the seat belt at the location of the passenger seat; and generating an alert based on the second output indicating that the seat belt is not latched and the third output indicating that the seat is occupied.

8. The method of claim 7, further including determining occupancy of the passenger seat using a pressure sensor.

9. The method of claim 7, further including detecting passenger movement using an optical sensor.

10. The method of claim 7, further including receiving fourth output from the seat belt latch sensor in response to a notification to secure a flight deck of an aircraft.

11. The method of claim 7, further including engaging a locking feature to maintain the seat belt in a locked state during at least one of a taxi, takeoff, or landing of the aircraft.

12. The method of claim 11, further including engaging an automatic safety override to release the locking feature when acceleration of the aircraft exceeds a predetermined threshold.

13. A non-transitory machine readable storage medium comprising instructions to cause programmable circuitry to at least:

receive first output from an identifier via at least one RFID antenna, the identifier associated with a location of a passenger seat on an aircraft;

receive second output from a seat belt latch sensor via the at least one RFID antenna, the seat belt latch sensor associated with a seat belt of the passenger seat;

receive third output from an occupancy sensor via the at least one RFID antenna, the occupancy sensor associated with the passenger seat;

determine a usage status of the seat belt at the location of the passenger seat based on the first, second and third outputs;

generate a seat diagram, the seat diagram including the usage status of the seat belt at the location of the passenger seat; and generate an alert based on the second output indicating that the seat belt is not latched and the third output indicating that the seat is occupied.

14. The machine readable storage medium as defined in claim 13, wherein the instructions, when executed, cause the programmable circuitry to determine occupancy of the passenger seat using a pressure sensor.

15. The machine readable storage medium as defined in claim 13, wherein the instructions, when executed, cause the programmable circuitry to detect passenger movement using an optical sensor.

16. The machine readable storage medium as defined in claim 13, wherein the instructions, when executed, cause the programmable circuitry to engage a locking feature to maintain the seat belt in a locked state during at least one of a taxi, takeoff, or landing of the aircraft.

17. The machine readable storage medium as defined in claim 16, wherein the instructions, when executed, cause the programmable circuitry to engage an automatic safety override to release the locking feature when acceleration of the aircraft exceeds a predetermined threshold.

18. The apparatus of claim 1, wherein the at least one RFID antenna includes a plurality of RFID antennas positioned in a cabin of the aircraft.

19. The apparatus of claim 1, wherein each seat of the aircraft includes a respective RFID transmitter.

20. The apparatus of claim 5, including a seat belt lock sensor to provide a fourth output corresponding to whether the locking feature is engaged via the at least one RFID antenna.

* * * * *